(12) United States Patent
Kim et al.

(10) Patent No.: US 7,843,889 B2
(45) Date of Patent: Nov. 30, 2010

(54) APPARATUS AND METHOD FOR POWER ALLOCATION IN A SPACE DIVISION MULTIPLE ACCESS SYSTEM

(75) Inventors: Nam-Gi Kim, Suwon-si (KR); Byoung-Ha Yi, Seoul (KR)

(73) Assignee: Samsung Electronics Co., Ltd (KR)

( * ) Notice: Subject to any disclaimer, the term of this patent is extended or adjusted under 35 U.S.C. 154(b) by 1014 days.

(21) Appl. No.: 11/642,614

(22) Filed: Dec. 20, 2006

(65) Prior Publication Data

US 2007/0142087 A1 Jun. 21, 2007

(30) Foreign Application Priority Data

Dec. 21, 2005 (KR) ...................... 10-2005-0126647

(51) Int. Cl.
*H04W 4/00* (2009.01)
(52) U.S. Cl. ..................................... 370/334; 455/13.4
(58) Field of Classification Search ................. 455/522, 455/450, 13.4; 370/335
See application file for complete search history.

(56) References Cited

U.S. PATENT DOCUMENTS 6,463,295 B1 10/2002 Yun

2004/0087343 A1 5/2004 Lucidarme et al.
2007/0173277 A1* 7/2007 Yun ............................ 455/522

FOREIGN PATENT DOCUMENTS

| JP | 2004-180108 | 6/2004 |
|---|---|---|
| JP | 2004-201296 | 7/2004 |
| KR | 1020040098676 | 11/2004 |
| KR | 1020050060084 | 6/2005 |

* cited by examiner

*Primary Examiner*—Rafael Pérez-Gutiérrez
*Assistant Examiner*—Marcos Batista
(74) *Attorney, Agent, or Firm*—The Farrell Law Firm, LLP

(57) ABSTRACT

Provided is an apparatus and method for power allocation in a Space Division Multiple Access (SDMA) system. The apparatus includes an encoder, an antenna weighting calculator, and an antenna. The antenna weighting calculator divides a transmission power of a Base Station (BS) by number of Mobile Stations (MSs), fixedly distributes the divided transmission powers to the MSs, calculates a surplus power of each MS, sums up the calculated surplus power to thereby calculate a total surplus power, calculates a power per MS needed for an MPR one level higher, determines whether there is an MS whose power needed for a next level MPR is smaller than the total surplus power, and additionally allocates the total surplus power when there is the MS.

16 Claims, 3 Drawing Sheets

APPARATUS AND METHOD FOR POWER ALLOCATION IN A SPACE DIVISION MULTIPLE ACCESS SYSTEM

PRIORITY

This application claims priority under 35 U.S.C. §119 to an application entitled "Apparatus And Method For Power Allocation In Space Division Multiple Access System" filed in the Korean Intellectual Property Office on Dec. 21, 2005 and assigned Serial No. 2005-126647, the contents of which are incorporated herein by reference.

BACKGROUND OF THE INVENTION

1. Field of the Invention

The present invention relates to an apparatus and method for differentially distributing a transmission power by a Base Station (BS) (a transmitter) to Mobile Stations (MSs) (receivers) depending on a channel state of each MS in a Space Division Multiple Access (SDMA) system.

2. Description of the Related Art

A Space Division Multiple Access (SDMA) system is a wireless communication system for allocating a radio resource to a plurality of Mobile Stations (MSs), at the same frequency at the same time, using a plurality of adaptive antennas. The SDMA system allocates the radio resource simultaneously to the plurality of MSs, thereby greatly increasing a system capacity. In the SDMA system, however, a Base Station (BS) allocates the radio resource to the plurality of MSs, at the same frequency at the same time, under circumstances where there is a fixed transmission power. Therefore, the transmission power for each MS should be divided.

The conventional SDMA system equally allocates the transmission power of the BS considering only the number of the MSs allocated the radio resource, at the same frequency at the same time, irrespective of a channel state of the MS. For example, if the MS allocated the radio resource, at the same frequency at the same time is three; the BS divides the transmission power by ⅓, and uses the divided transmission powers to transmit a signal to each MS. However, the MSs have different channel states from each other depending on location and time, respectively. Thus, fixed distribution of the transmission power irrespective of the channel state of the MS results in an excessive power for one MS and an insufficient power for another MS depending on the channel state of the MS. It thereby reduces a performance such as a data reception rate of an entire system.

Accordingly, an apparatus and method for differentially distributing a transmission power considering a channel state of each of a plurality of MSs when an SDMA system allocates a radio resource to the plurality of MSs, thereby enhancing a system performance is being required.

SUMMARY OF THE INVENTION

An object of the present invention is to substantially solve at least the above problems and/or disadvantages and to provide at least the advantages described below. Accordingly, an aspect of the present invention is to provide an apparatus and method for improving a system performance in a Space Division Multiple Access (SDMA) system.

Another object of the present invention is to provide an apparatus and method for differentiating and distributing a transmission power considering a channel state of each MS when a radio resource is allocated to a plurality of MSs in an SDMA system.

According to an aspect of the present invention, there is provided an apparatus for power allocation in a Space Division Multiple Access (SDMA) system. The apparatus includes an encoder, an antenna weighting calculator, and an antenna. The encoder encodes input data. The antenna weighting calculator divides the transmission power of the BS by number of MSs to be allocated a radio resource, fixedly distributes the divided transmission powers to the MSs, calculates a surplus power of each MS, sums up the calculated surplus power of each MS to thereby calculate a total surplus power, calculates a power per MS needed for a Modulation order Product code Rate (MPR) higher up by one level, determines whether there is an MS whose power, needed for a next level MPR, is smaller than the total surplus power of the BS among the MSs, and additionally allocates the total surplus power to the MS when it is determined that there is the MS. The antenna transmits data at each MS using the transmission power of each MS allocated by the antenna weight calculator.

According to another aspect of the present invention, there is provided a method for power allocation in a Space Division Multiple Access (SDMA) communication system. The method includes dividing the transmission power of a Base Station (BS) by number of MSs to be allocated a radio resource, and fixedly distributing the divided transmission powers to the MSs; calculating a surplus power of each MS; summing up the calculated surplus power of each MS, and calculating a total surplus power; calculating a power per MS needed for a Modulation order Product code Rate (MPR) higher up by one level; determining whether there is an MS whose power needed for a next level MPR is smaller than the total surplus power of the BS among the MSs; and additionally allocating the total surplus power to the MS when it is determined that there is the MS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figures 1A, 1B:
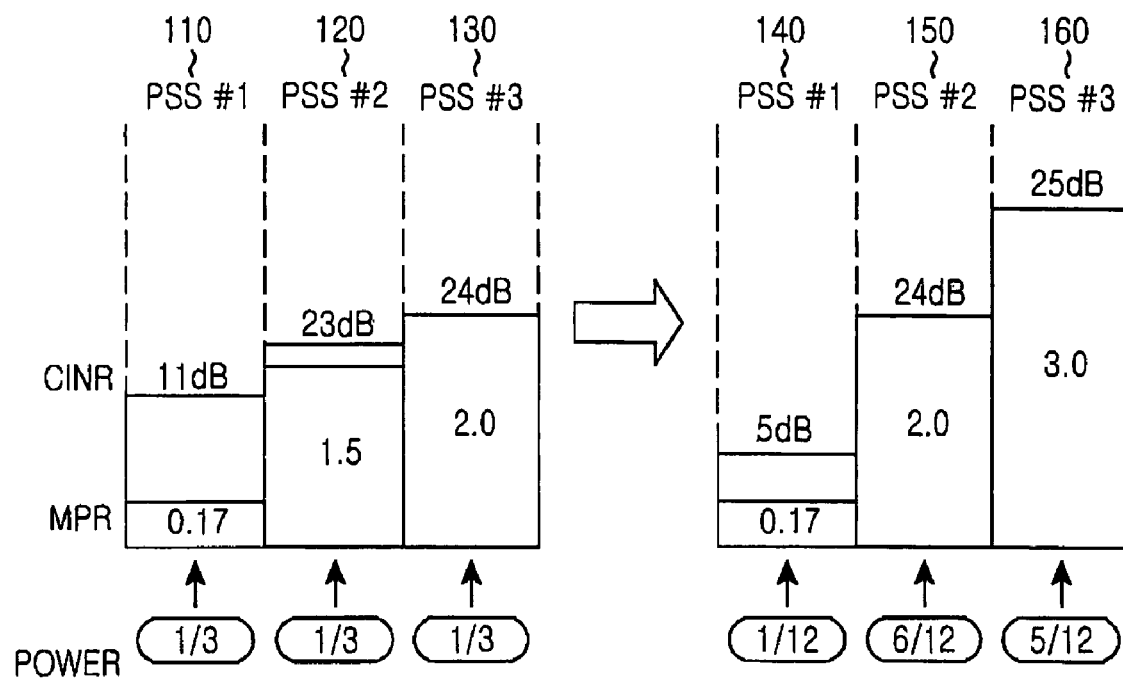
FIGS. 1A and 1B illustrate the improvement of system efficiency when a signal is transmitted to a Mobile Station (MS) in a Space Division Multiple Access (SDMA) system according to the present invention.

Preferred embodiments of the present invention will be described herein below with reference to the accompanying drawings. In the following description, well-known functions or constructions are not described in detail since they would obscure the invention in unnecessary detail.

Carrier to Interference Noise Ratio (CINR) of a Mobile Station (MS) is influenced by a data reception rate for receiving data from a Base Station (BS) in a Space Division Multiple Access (SDMA) communication system. The CINR of the MS is determined depending on a channel state of the MS dependent on position and time, and a transmission power of the BS. When the MS has a good channel state with the BS, and the BS has a great transmission power, the MS has a high CINR and a high data reception rate. Alternatively, when the MS has a poor channel state with the BS, and the BS has a small transmission power, the MS has a low CINR and a low data reception rate.

Table 1 below illustrates an example of CINR to Modulation order Product code Rate (MPR) in Institute of Electrical and Electronics Engineers (IEEE) 802.16 WirelessMAN system. The data reception rate of the MS can be larger as the MPR is high. In Table 1, the CINR within a predetermined range uses the same MPR. For example, an MS having a CINR of 4 dB and an MS having a CINR of 11 dB are serviced at the same data reception rate because they all use an MPR of 0.17 and a Modulation Coding Scheme (MCS) level of Quadrature Phase Shift Keying (QPSK) ½ repetition 6.

TABLE 1

CINR to MPR

| CINR (dB) | MPR | MCS level |
|---|---|---|
| 3 | 0.17 | QPSK ½ repetition 6 |
| 12 | 0.25 | QPSK ½ repetition 4 |
| 15 | 0.5 | QPSK ½ repetition 2 |
| 18 | 1.0 | QPSK ½ repetition 1 |
| 21 | 1.5 | QPSK ⅔ |
| 24 | 2.0 | 16 QAM ½ |
| 25 | 3.0 | 16 QAM ¾ |
| 26 | 4.0 | 64 QAM ⅔ |
| 27 | 5.0 | 64 QAM ⅚ |

The transmission power of the BS as well as the channel state influence the CINR of the MS. For example, when the transmission power increases double, the CINR also increases about double. When the transmission power decreases half, the CINR also decreases about half.

However, as shown in Table 1, though an MS of which CINR is 11 dB, if any, is given only a CINR of more than 3 dB, it has the same MPR. Therefore, the MS concedes a part of a power allocated to itself to another MS, so that the BS allocates the partial power to another MS, thereby increasing a CINR of another MS. Thus, there is room for improvement of an entire system performance.

As described above, the MS allocated a radio resource, at the same frequency at the same time, varies in its CINR depending on the channel state and the transmission power allocated by the BS in the SDMA system. If the MSs allocated the radio resource, at the same frequency at the same time, are fixedly distributed the transmission power of the BS irrespectively of the channel state, any MS is allocated a great power compared with a required CINR, and another MS is allocated a small power compared with the required CINR. Thus, the entire system performance can be deteriorated.

FIG. 1 illustrates the improvement of system efficiency when a signal is transmitted to an MS in an SDMA system according to the present invention. In detail, FIG. 1 illustrates an example in which inefficiency occurring when the radio resource allocated MSs are fixedly allocated the transmission power is overcome by power differential distribution, thereby improving a system performance.

As shown in FIG. 1A, when an MS1 (PSS#1) 110, an MS2 (PSS#2) 120, and an MS3 (PSS#3) 130 allocated the radio resource, at the same frequency at the same time, are fixedly distributed the transmission power of the BS by ⅓, respectively, they have CINRs of 11 dB, 23 dB, and 24 dB, respectively, because of the channel state as shown in the Table 1.

Here, the MS1 (PSS#1) 110, the MS2 (PSS#2) 120, and the MS3 (PSS#3) 130 can use MPRs of 0.17, 1.5, and 2.0, respectively, as shown in the Table 1. Accordingly, a total MPR supported in the SDMA system is 3.67.

However, as shown in FIG. 1B the power allocated to the MS1 (PSS#1) 110 reduces by ¼, so that an MS1 (PSS#1) 140 has 1/12 of a total power, and an MS2 (PSS#2) 150 and an MS3 (PSS#3) 160 each are added a reduced power by 2/12 and 1/12, thereby allocating 6/12 and 5/12 of the total power to the MS2 (PSS#2) 150 and the MS3 (PSS#3) 160, respectively, and changing the CINRs to 5 dB, 24 dB, and 25 dB, respectively. Then, the MSs can be serviced with the MPRs of 0.17, 2.0, and 3.0, respectively, as shown in the Table 1, and an entire system can have an MPR of 5.17, thereby greatly improving the system performance.

Figure 2:
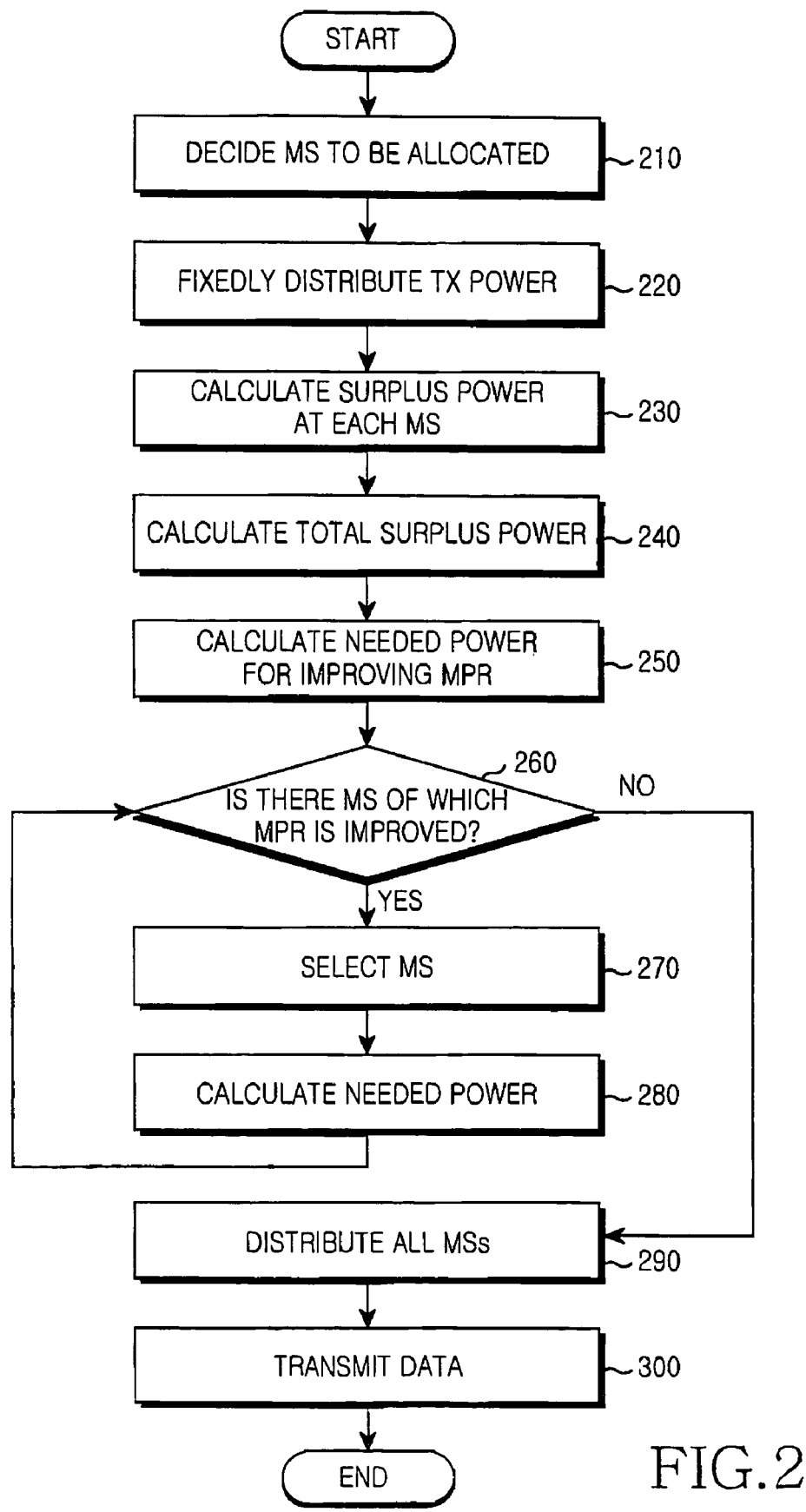
FIG. 2 is a flowchart illustrating a procedure of transmitting, by a Base Station (BS), a signal to an MS in an SDMA system according to the present invention.

FIG. 2 is a flowchart illustrating a procedure of transmitting, by the BS, a signal to the MS in the SDMA system according to the present invention. The MSs to be allocated the radio resource at the same frequency at the same time are decided in Step 210. Next, the number of the MSs to be allocated the radio resource divides the transmission power of the BS, and the divided transmission powers are fixedly distributed to the MSs in Step 220. In this Step, the CINR of each MS fixedly distributed the transmission power of the BS, and the MPR associated with the CINR are obtained. It is assumed that the CINR of each MS is fed back from the MS. Alternately, it can be replaced with a CINR of an upper link for transmitting data in the MS.

After that, in Step 230 a surplus power of each MS is calculated referring to the Table 1. After the transmission power is fixedly allocated, the surplus power of each MS is expressed in Equation (1) below:

$$P_{surplus,i} = \frac{CINR_i - CINR_{level,i}}{CINR_i} \quad (1)$$

where $CINR_i$: CINR of MS (i), and $CINR_{level,i}$: minimal CINR required for current MPR level of MS (i).

THe power per MS needed for MPR one level higher is expressed in Equation (2):

$$P_{need,i} = \frac{CINR_{high\_level,i} - CINR_i}{CINR_i} \quad (2)$$

where $CINR_{high\_level,i}$: CINR of MPR higher up by one level of MS (i).

Accordingly, a weight of the MS decreasing by the surplus power is expressed in Equation (3):

$$\tilde{w}_k = \sqrt{1 - P_{surplus,k}} \times w_k \quad (3)$$

A weight of the MS increasing by the needed power is expressed in Equation (4):

$$\tilde{w}_l = \sqrt{1 - P_{need,l}} \times w_l \quad (4)$$

When a total of the N number of the MSs are allocated the radio resource, at the same frequency at the same time, in case where they are fixedly equally allocated the power before being differentially distributed the power, a weight of each MS is expressed in Equation (5):

$$|w_i|^2 = \frac{1}{N}, (|w_1|^2 + |w_2|^2 + \ldots + |w_N|^2 = 1) \quad (5)$$

Next, in step 240 a total surplus power is calculated by summing up the surplus power of each MS. Assuming that "K" is the number of the MSs having the surplus power, the total surplus power ($P_{surplus}$) obtained by summing up all the surplus power of the MSs is calculated in Equation (6):

$$P_{surplus} = \sum_{k=1}^{K} P_{surplus,k} \quad (6)$$

Next, in step 250 a need power per MS needed for an MPR one level higher is calculated. Assuming that "L" is the number of the MSs allocated an additional power, a sum of need powers ($P_{need}$) additionally required by the MSs is calculated in Equation (7):

$$P_{need} = \sum_{l=1}^{L} P_{need,l} \quad (7)$$

After that, in Step 260 it is determined whether there exists an MS to improve the MPR among the MSs, by determining whether there exists the MS whose power needed for a next level MPR is smaller than the total surplus power of the BS.

In Step 290, when it is determined that there does not exist the MS, all the MSs are equally distributed the surplus power ( ).

When it is determined that there exists the MS, the MS having the greatest ratio of MPR difference to need power is selected at the highest priority amongst the MSs, and the selected MS is additionally allocated the power needed by the selected MS amongst the total surplus power. By so doing, in Step 270 the MS whose MPR is most easily improved is selected. Next, in Step 280 a power per MS needed for an MPR level again one level higher is calculated ( ), and it returns to the Step 260.

Lastly, by repeating this process, the MS additionally needing the power is additionally allocated the total surplus power. If so, a residual power ($P_{residual}$) is expressed in Equation 8:

$$P_{residual} = P_{surplus} - P_{need} = \sum_{k=1}^{K} P_{surplus,k} - \sum_{l=1}^{L} P_{need,l} \quad (8)$$

In Step 290 When there exists no longer the MS to improve the MPR after all the MSs are equally distributed the residual power, all the MSs are equally distributed the surplus power, and a final weight of each MS is calculated in Equation (9):

$$W_k(\text{final}) = \sqrt{1 - P_{surplus,k} + \frac{P_{residual}}{N}} \times w_k, \text{ for surplused PSS} \quad (9)$$

$$W_l(\text{final}) = \sqrt{1 + P_{need,l} + \frac{P_{residual}}{N}} \times w_l, \text{ for needed PSS}$$

-continued
$$W_m(\text{final}) = \sqrt{1 + \frac{P_{residual}}{N}} \times w_m, \text{ otherwise}$$

The differentially distributed transmission power is used for transmitting data to each MS in Step 300.

Figure 3:
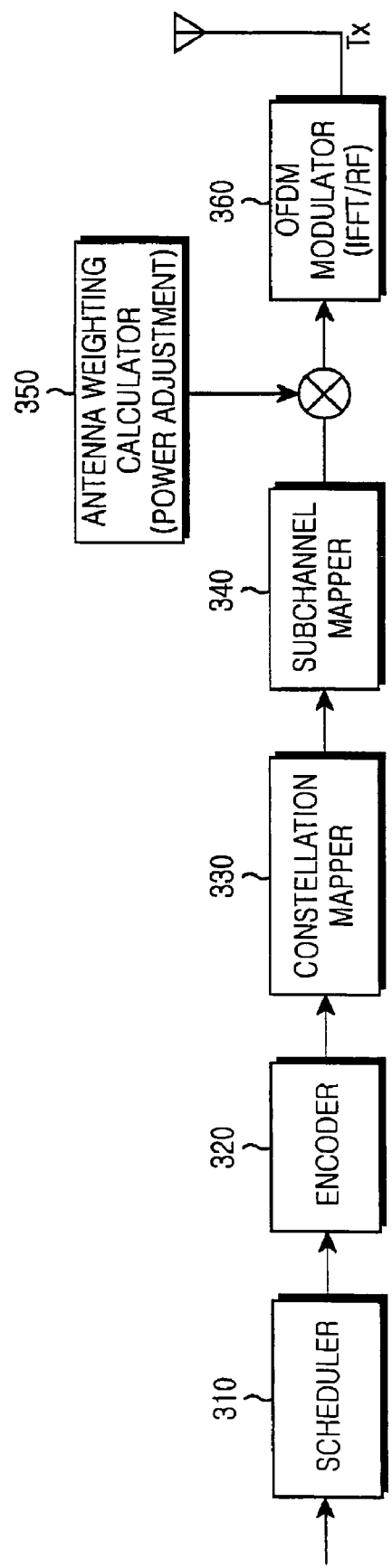
FIG. 3 is a block diagram illustrating architecture of a BS transmitting a signal to an MS in an SDMA system according to the present invention.

FIG. 3 is a block diagram illustrating architecture of the BS transmitting a signal to the MS in the SDMA system according to the present invention. An Orthogonal Frequency Division Multiplexing (OFDM) communication system is described. Understandably, the present invention is applicable to other communication systems such as an Orthogonal Frequency Division Multiple Access (OFDMA) communication system.

A scheduler 310 schedules data to be transmitted and a priority of a destination MS. Next, an encoder 320 encodes the data to be transmitted. After that, a constellation mapper 330 and a subchannel mapper 340 map the encoded data. An OFDM modulator 360 OFDM modulates the mapped data, and transmits the modulated data through an antenna. An antenna weighting calculator 350 (also, called a power adjustment) differentiates the transmission power at each MS as above before the mapped data is inputted to the OFDM modulator 360. By so doing, the data is transmitted to each MS through a plurality of antennas using the differentiated transmission power, thereby increasing the system efficiency.

The present invention improves system performance by differentially distributing the transmission power to each MS when the BS transmits a signal depending on the channel state of the MS receiving a signal in the SDMA system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A Base Station (BS) of a Space Division Multiple Access (SDMA) communication system, the BS comprising:
   an antenna weighting calculator for differentially allocating a transmission power to each Mobile Station (MS) depending on a channel state of each of a plurality of MSs; wherein when differentially allocating the transmission power to each MS, the antenna weighting calculator divides the transmission power of the BS by number of MSs to be allocated, fixedly distributes the divided transmission powers to the MSs, calculates a surplus power of each MS, sums up the calculated surplus power of each MS to thereby calculate a total surplus power, calculates a power per MS needed for a Modulation order Product code Rate (MPR) one level higher, determines whether there is an MS whose power needed for the MPR one level higher is smaller than the total surplus power of the BS among the MSs, and additionally allocates the total surplus power to the MS when it is determined that there is the MS; and
   a plurality of antennas for transmitting corresponding data to the each MS according to the allocated transmission power to the each MS by the antenna weighting calculator.

2. The BS of claim 1, wherein the SDMA communication system is one of an Orthogonal Frequency Division Multiplexing (OFDM) communication system and an Orthogonal Frequency Division Multiple Access (OFDMA) communication system.

3. The BS of claim 1, wherein when additionally allocating the total surplus power to the MS, the antenna weight calculator selects an MS having greatest ratio of MPR difference to need power at highest priority, and additionally allocates a power needed by the selected MS among the total surplus power to the selected MS, thereby selecting the MS whose MPR is most easily improved.

4. The BS of claim 1 wherein when calculating the surplus power of each MS, the antenna weight calculator uses $$P_{surplus,i} = \frac{CINR_i - CINR_{level,i}}{CINR_i},$$

where $CINR_i$: CINR of MS(i), and $CINR_{level,i}$: minimal CINR required for current MPR level of MS (i).

5. The BS of claim 1 wherein when calculating the power per MS needed for the MPR one level higher, the antenna weight calculator uses $$P_{need,i} = \frac{CINR_{high\_level,i} - CINR_i}{CINR_i},$$

where $CINR_{high\_level,i}$: CINR of MPR one level higher of MS (i).

6. The BS of claim 1, wherein information on a channel state of each of the plurality of MSs is fed back from the plurality of MSs.

7. A method for power allocation in a Space Division Multiple Access (SDMA) communication system, the method comprising the steps of:
    differentially allocating a transmission power to each Mobile Station (MS) depending on a channel state of each of a plurality of MSs; wherein the differentially allocating of the transmission power comprises:
        dividing the transmission power of a Base Station (BS) by number of MSs to be allocated a radio resource, and fixedly distributing the divided transmission powers to the MSs;
        calculating a surplus power of each MS;
        summing up the calculated surplus power of each MS, and calculating a total surplus power;
        calculating a power per MS needed for a Modulation order Product code Rate (MPR) one level higher;
        determining whether there is an MS whose power needed for a next level MPR is smaller than the total surplus power of the BS among the MSs; and
        additionally allocating the total surplus power to the MS when it is determined that there is the MS; and
    transmitting corresponding data to the each MS according to the allocated transmission power to the each MS.

8. The method of claim 7 further comprising equally distributing the total surplus power to all the MSs, and transmitting data to each MS, when it is determined that there is not the MS whose power needed for the next level MPR is smaller than the total surplus power of the BS.

9. The method of claim 7 further comprising selecting an MS having greatest ratio of MPR difference to need power at highest priority among the MSs, and additionally allocating a power needed by the selected MS among the total surplus power to the selected MS, thereby selecting the MS whose MPR is most easily improved, when it is determined that there is the MS whose power needed for the next level MPR is smaller than the total surplus power of the BS.

10. The method of claim 7 wherein the calculating of the surplus power of each MS uses $$P_{surplus,i} = \frac{CINR_i - CINR_{level,i}}{CINR_i},$$

where $CINR_i$: CINR of MS (i), and $CINR_{level,i}$: minimal CINR required for current MPR level of MS (i).

11. The method of claim 7 wherein the calculating of the power per MS needed for the MPR one level higher uses $$P_{need,i} = \frac{CINR_{high\_level,i} - CINR_i}{CINR_i},$$

where $CINR_{high\_level,i}$: CINR of MPR one level higher of MS (i).

12. The method of claim 7, wherein the SDMA communication system is one of an Orthogonal Frequency Division Multiplexing (OFDM) communication system and an Orthogonal Frequency Division Multiple Access (OFDMA) communication system.

13. The method of claim 7, wherein information on a channel state of each of the plurality of MSs is fed back from the plurality of MSs.

14. A Base Station (BS) of a Space Division Multiple Access (SDMA) system, the BS comprising:
    a scheduler for scheduling transmission data and a priority of a Mobile Station (MS);
    an encoder for encoding the transmission data;
    a mapper for mapping the encoded data;
    an antenna weighting calculator for differentially allocating a transmission power, which is used for transmitting the mapped data, to each MS depending on a channel state of each of a plurality of MSs; wherein when differentially allocating the transmission power to each MS, the antenna weighting calculator divides the transmission power of the BS by number of MSs to be allocated, fixedly distributes the divided transmission powers to the MSs, calculates a surplus power of each MS, sums up the calculated surplus power of each MS to thereby calculate a total surplus power, calculates a power per MS needed for a Modulation order Product code Rate (MPR) one level higher, determines whether there is an MS whose power needed for the MPR one level higher is smaller than the total surplus power of the BS among the MSs, and additionally allocates the total surplus power to the MS when it is determined that there is the MS; and
    a plurality of antennas for transmitting corresponding data to the MS by the allocated transmission power of each MS.

15. The BS of claim 14, wherein the SDMA communication system is one of an Orthogonal Frequency Division Multiplexing (OFDM) communication system and an Orthogonal Frequency Division Multiple Access (OFDMA) communication system.

16. The BS of claim 14, wherein information on a channel state of each of the plurality of MSs is fed back from the plurality of MSs.

* * * * *